United States Patent

Kolb et al.

[11] Patent Number: 5,918,928
[45] Date of Patent: Jul. 6, 1999

[54] VEHICLE FOLDING TOP PROVIDING DEFINED CONTACT PRESSURE

[75] Inventors: Eugen Kolb, Stuttgart; Kurt Pfertner, Wimsheim; Jan Just, Tuebingen-Bebenhausen, all of Germany

[73] Assignee: Dr. Ing. H.C.F. Porsche AG, Germany

[21] Appl. No.: 08/840,047

[22] Filed: Apr. 24, 1997

[30] Foreign Application Priority Data

Apr. 24, 1996 [GB] United Kingdom ............. 196 16 255

[51] Int. Cl.⁶ ..................................... G60J 7/12
[52] U.S. Cl. ................. 296/107.04; 296/107.12
[58] Field of Search ............ 296/107.04, 107.09, 296/107.12, 116, 118, 122

[56] References Cited

U.S. PATENT DOCUMENTS

| | | |
|---|---|---|
| 2,855,663 | 10/1958 | Weber et al. |
| 3,075,804 | 1/1963 | Geiger et al. ................. 296/107.12 |
| 4,491,361 | 1/1985 | Kolb ......................... 296/107.04 X |
| 4,746,163 | 5/1988 | Muscat ...................... 296/107.04 X |
| 4,747,635 | 5/1988 | Wagner ........................ 296/107.12 |
| 5,320,400 | 6/1994 | Orth et al. .................. 296/107.04 X |
| 5,641,193 | 6/1997 | Zepnik et al. ................. 296/107.09 |

FOREIGN PATENT DOCUMENTS

| | | |
|---|---|---|
| 91 02 147 | 6/1991 | Germany . |
| 361268521 | 11/1986 | Japan ...................... 296/107.04 |
| 882575 | 11/1961 | United Kingdom . |

*Primary Examiner*—Joseph D. Pape
*Attorney, Agent, or Firm*—Evenson, McKeown, Edwards & Lenahan, P.L.L.C.

[57] ABSTRACT

A folding top for vehicles has a tension bow which is connected with the rearward lower edge of the folding top covering. In the closed position of the folding top, the covering is supported by at least one sealing body on the bottom side of an adjoining vehicle body part. So that damage to the vehicle body part as a result of an excessive contact pressure of the tension bow is avoided and a defined contact pressure of the sealing body can be achieved, the tension bow is connected with a stationary rollover bar by way of at least one adjustable relief device.

10 Claims, 1 Drawing Sheet

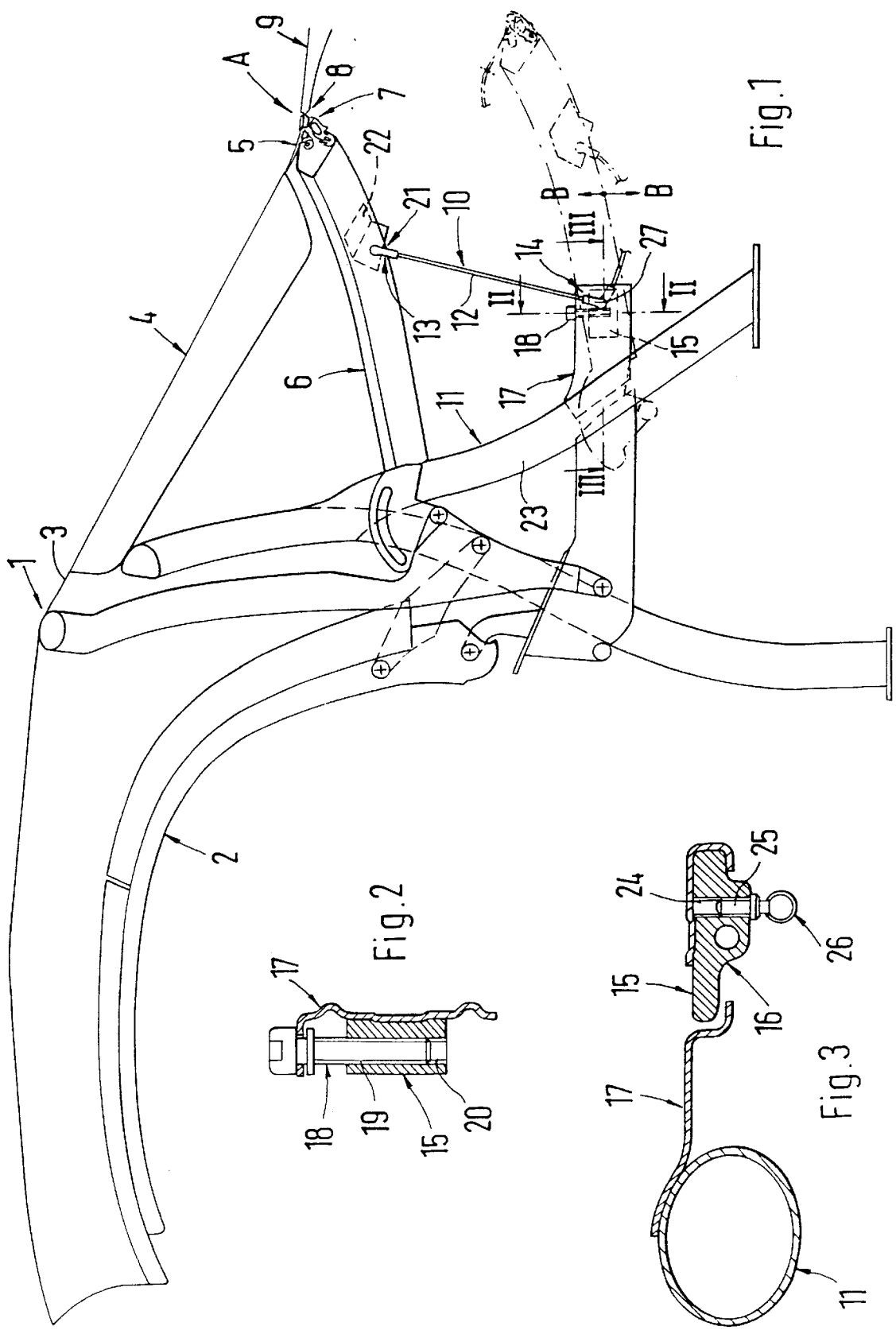

VEHICLE FOLDING TOP PROVIDING DEFINED CONTACT PRESSURE

BACKGROUND AND SUMMARY OF THE INVENTION

This application claims the priority of 196 16 255.6, the disclosure of which is expressly incorporated by reference herein.

The present invention relates to a folding top for vehicles having a tension bow which receives the rearward lower edge of the top cover and which is supported in the closed position of the top by at least one sealing body on the bottom side of a vehicle body part.

DE-U 91 02 147 describes a folding top arrangement wherein, in the closed position of the top, the tension bow is pressed by the linking of the top cover in the upward direction against the vehicle body part situated thereabove. Depending on the weather conditions and the occurring tolerances, the sealing body is compressed to different degrees which under unfavorable conditions may lead to a permanent deformation of the adjoining vehicle body part.

It is an object of the invention provide an improved folding top arrangement such that, on a rearward-side tension bow, in the closed position of the folding top the tension bow presses against the vehicle body part situated above only with a defined contact pressure force. Thereby, an excessive squeezing-together of the sealing body disposed in-between is avoided.

According to the invention, this object has been achieved by connecting the tension bow with a stationary rollover bar by way of at least one adjustable relief device.

Among the principal advantages achieved with the present invention are that, as the result of the arrangement of at least one adjustable relief device between the tension bow and the rollover bar, the desired mounting position of the tension bow can be simply adjusted when the folding top is closed so that the contact pressure occurring on the interposed sealing body can be controlled.

When the top is closed, the tension bow is pulled downward by one or several relief devices so that an undesired excessive action upon the adjoining vehicle body part or sealing body is avoided.

The relief device has a simple construction such as a tension cable which is detachably connected on one side to the tension bow and, on the other side, to the adjoining rollover bar disposed in front. At least one end of the tension cable is fastened in a detachable manner to swivel the tension bow into an upright mounting position.

The end of the tension cable which faces the rollover bar is connected by a spherical head connection to a carriage which is slidably disposed in a receiving section of a rollover-bar-side holder, the position of the carriage being changeable by an adjusting screw.

BRIEF DESCRIPTION OF THE DRAWINGS

Other objects, advantages and novel features of the present invention will become apparent from the following detailed description of the invention when considered in conjunction with the accompanying drawings.

FIG. 1 is a partial side view of a folding top of a vehicle having a relief device for the rearward-side tension bow in accordance with the present invention;

FIG. 2 is an enlarged sectional view along line II—II of FIG. 1; and

FIG. 3 is an enlarged sectional view along line III—III of FIG. 1.

DETAILED DESCRIPTION OF THE DRAWINGS

A folding top designated generally by numeral 1 for a vehicle has a carrying folding top structure 2 and an elastic folding top cover 3 fastened thereto. In the rearward, transversely extending area of the folding top 1, a rear window 4 is provided which is formed by a rigid or flexible window pane.

A rearward lower edge 5 of the folding top cover 2 is fastened below the rear window 4 on a tension bow 6 which is formed, at least in sections, by a bent extruded profile part of a light metal alloy. In the top view, the tension bow 6 spans the passenger compartment in a curved manner and is rotatably connected with the folding top structure on its two forward ends.

In the closed position A (solid line) of the folding top 1, the tension bow 6 rests by way of at least one sealing body 7 against the bottom side 8 of the adjoining vehicle body part 9, specifically on its forward edge. The vehicle body part 9 can be stationary or can be a swivellable flap.

A defined contact pressure of the sealing body or sealing bodies 7 in the closed position A of the folding top 1 is achieved in that at least one relief device 10 is applied to the tension bow 6, so that the tension bow 6 can be adjusted in the vertical direction. The relief device 10 extends between the tension bow 6 and a stationary rollover bar 11 situated forwardly.

A relief device 10 is arranged on each longitudinal side of the folding top 1, specifically in a rearward area of the longitudinal course of the tension bow 6, so that two relief devices for the tension bow 6 are provided here. Each relief device 10 includes an upright extending tension cable 12 with one end 13 connected to the tension bow 6 and the other end 14 connected with a carriage 15 which is disposed slidably in the vertical direction B—B in a receiving section 16 of a holder 17 mounted on the rollover bar 11 in which case the carriage 15 can be adjusted by an adjusting screw 18. The adjusting screw 18, which extends in the vertical direction, is rotatably disposed on the holder 17 and has an external thread 19 screwed into an internal thread 20 of the carriage 15.

Both ends of the tension cable 12 are connected by spherical-head connections 21 with a holding angle 22 mounted on the tension bow 6 or the carriage 15 of the relief device 10. At least one end of the tension cable 12 is constructed to be detachable in order to be able to swivel the tension bow 6 into an upright, approximately vertical mounting position.

An end-side ball socket of the tension cable 12 is fitted onto a spherical head mounted on the holding angle 22. In the closed position A of the folding top 1, the tension cable 12 extends approximately vertically or slightly diagonally. According to FIG. 1, the tension cable 12 extends diagonally from the rearward top to the forward bottom, i.e. from upper right to lower left.

The holder 17, which receives the carriage 15, is fastened on a rearward, diagonally extending supporting section 23 of the rollover bar, specifically by welding. The holder 17 is aligned approximately horizontally and points toward the rear with its free end. The carriage 15 is guided in the profiled receiving section 16 of the holder 17. Laterally in the interior, a pin 25 is screwed with an end-side spherical head 26 into a threaded bore. A ball socket 27, which is connected with the lower end of the tension cable 12, can be pressed onto the spherical head 26. As required, the ball socket 27 can be detached from the spherical head 26.

The rotation of the adjusting screw 18 causes the carriage 15 to move up or down, and the tension bow 6 can be adjusted by the tension cable 12 so that the corresponding contact pressure of the sealing body 7 or of the tension bow 6 is set. The holder 17, which receives the carriage 15, instead of being provided on the rollover bar 11, may also be provided on the vehicle-body side on an adjoining vehicle body part.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Folding top for a vehicle with a stationary rollover bar, comprising a folding top cover, a rearward-side tension bow configured to receive a rearward lower edge of the folding top cover, at least one sealing body on a bottom side of a vehicle body part for supporting the tension bow in a closed position of the folding top, and at least one adjustable relief device configured to connect the tension bow with the stationary rollover bar.

2. Folding top according to claim 1, wherein the at least one relief device is provided on each longitudinal side of the tension bow which, as viewed looking down on the vehicle, has a curved shape and spans a passenger compartment of the vehicle.

3. Folding top according to claim 1, wherein a holder is mounted on the stationary rollover bar, and the at least one relief device comprises an upright extending tension cable having one end connected to the tension bow and another end connected with a carriage which is adjustably disposed in a receiving section of the holder.

4. Folding top according to claim 3, wherein the at least one relief device is provided on each longitudinal side of the tension bow which, as viewed looking down on the vehicle, has a curved shape and spans a passenger compartment of the vehicle.

5. Folding top according to claim 3, wherein the one and another ends of the tension cable are detachably connected, via spherical-head connections to one of the tension bow and the rollover bar.

6. Folding top according to claim 5, wherein the at least one relief device is provided on each longitudinal side of the tension bow which, as viewed looking down on the vehicle, has a curved shape and spans a passenger compartment of the vehicle.

7. Folding top according to claim 3, wherein, in closed position of the folding top, the tension cable extends diagonally from a rearward top vehicle position to a forward bottom vehicle position, in a laterally exterior, longitudinally disposed area of the tension bow.

8. Folding top according to claim 3, wherein the holder is mounted on a diagonally extending rearward supporting section of the rollover bar, on a side facing a rear vehicle area.

9. Folding top according to claim 3, wherein, as the result of the rotation of an upright adjusting screw, the carriage is configured to be adjusted in a vertical direction within the receiving section with rotation of an upright adjusting screw.

10. Folding top according to claim 4, wherein, on a side of the carriage facing the passenger compartment, a pin is screwed by an end-side spherical head into a threaded bore of the carriage, and the spherical head is detachably connected with a ball socket of the tension cable.

* * * * *